(12) United States Patent
Ikeda et al.

(10) Patent No.: US 7,120,614 B2
(45) Date of Patent: Oct. 10, 2006

(54) DATA CLASSIFIER USING LEARNING-FORMED AND CLUSTERED MAP

(75) Inventors: Hitoshi Ikeda, Ashigarakami-gun (JP); Noriji Kato, Ashigarakami-gun (JP); Hirotsugu Kashimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 511 days.

(21) Appl. No.: 10/353,935

(22) Filed: Jan. 30, 2003

(65) Prior Publication Data

US 2003/0158828 A1 Aug. 21, 2003

(30) Foreign Application Priority Data

Feb. 5, 2002 (JP) ............................. 2002-028744

(51) Int. Cl.
*G06N 5/00* (2006.01)
(52) U.S. Cl. ........................... 706/14; 706/46; 382/228
(58) Field of Classification Search ................ 706/14, 706/46; 382/228
See application file for complete search history.

(56) References Cited

U.S. PATENT DOCUMENTS

| | | | |
|---|---|---|---|
| 5,479,570 A | 12/1995 | Imagawa et al. | |
| 5,703,964 A | 12/1997 | Menon et al. | |
| 6,094,653 A | 7/2000 | Li et al. | |
| 6,108,446 A | 8/2000 | Hoshen | |
| 6,650,779 B1* | 11/2003 | Vachtesvanos et al. | 382/228 |
| 6,778,705 B1 | 8/2004 | Gutta et al. | |
| 6,904,423 B1* | 6/2005 | Nicolaou et al. | 706/46 |
| 2003/0169919 A1 | 9/2003 | Ikeda et al. | |

FOREIGN PATENT DOCUMENTS

| | | |
|---|---|---|
| JP | A 7-234854 | 9/1995 |
| JP | A 8-36557 | 2/1996 |
| JP | A 2002-190025 | 7/2002 |
| JP | A 2002-329188 | 11/2002 |

OTHER PUBLICATIONS

Kohonen, "Self-Organized Formation of Topologically Correct Feature Maps", Biological Cybernetics, vol. 43, pp. 59-69, 1982.
Ultsch et al., "Knowledge Extraction from Artificial Neural Networks and Applications", Proc. Transputer Anwender Treffen/World Transputer Congress TAT/WTC 93 Aachen, Springer, 1993.
Coomans et al., "Potential Methods in Pattern Recognition Part 2. Clupot—an Unsupervised Pattern Recognition Technique", Analytica Chimica Acta, vol. 133, pp. 225-239, 1981.

(Continued)

*Primary Examiner*—Wilbert L. Starks, Jr.
(74) *Attorney, Agent, or Firm*—Oliff & Berridge, PLC

(57) ABSTRACT

A data classifier performs a data classification process using prototypes classified into clusters. A prototype map is formed using mapping means and clustering means. The mapping means forms, through learning, a prototype map by adjusting coupling weights between a plurality of prototypes provided in a map space based on a plurality of input data. The clustering means calculates a predetermined measure between the prototypes and classifies the prototypes into a plurality of clusters based on the measure.

30 Claims, 8 Drawing Sheets

OTHER PUBLICATIONS

Terashima et al., "Unsupervised Cluster Segmentation Method Using Data Density Histogram on Self-Organizing Feature Map", Papers of the Institute of Electronics, Information, and Communication Engineers, D-II, vol. J79-D-II, No. 7, pp. 1280-1290, 1996.

Kirk et al., "A Self-Organizing Map with Dynamic Architecture for Efficient Color Quantization", IEEE, pp. 2128-2132, 2001.

Bauer et al., "Quantifying the Neighborhood Preservation of Self-Organizing Feature Maps", IEEE Transactions on Neural Networks, vol. 3, No. 4, pp. 570-579, 1992.

Martinetz et al., "Three-Dimensional Neural Net for Learning Visuomotor Coordination of a Robot Arm", IEEE Transactions on Neural Networks, vol. 1, No. 1, pp. 131-136, 1990.

Kohonen, "The Self-Organizing Map", Proceedings of the IEEE, vol. 78, No. 9, pp. 1464-1480, 1990.

Haese et al., "Auto-SOM: Recursive Parameter Estimation for Guidance of Self-Organizing Feature Maps", Neural Computation, vol. 13, pp. 595-619, 2001.

\* cited by examiner

A – STATE

| 7 | 8 | 9 |
| 4 | 5 | 6 |
| 1 | 2 | 3 |

B – STATE

| 7 | 8 | 9 |
| 4 | 5 | 6 |
| 4 | 2 | 3 |

C – STATE

| 4 | 6 | 6 |
| 4 | 4 | 6 |
| 4 | 4 | 6 |

D – STATE

| (4) | New | (6) | (6) |
| (4) | (4) | New | (6) |
| (4) | (4) | New | (6) |

New : NEW PROTOTYPE

FIG. 6

|   |   |   |
|---|---|---|
| 1 | 1 | 2 |
| 1 | 1 | 2 |
| 1 | 2 | 2 |

FIG. 7

DATA CLASSIFIER USING LEARNING-FORMED AND CLUSTERED MAP

BACKGROUND OF THE INVENTION

1. Field of the Invention

The present invention relates to a data classifier for classifying various data, such as sensory data including image and voice information.

2. Description of the Related Art

In recent years, the amount of information people receive has rapidly increased with the spread and advancement of information devices. In this environment, in order to facilitate selection of desired information, there is a strong demand for techniques for recognizing and classifying information without any human intervention.

To address this demand, there is a known clustering method wherein data to be classified are compared and similar data are classified into groups of data. For the determination of similarity, various methods are known such as, for example, a maximum likelihood method, a K-means method, a merge method, and an MDS (Multi-Dimensional Scaling) method. These clustering methods all require human execution of processes such as parameter setting.

On the other hand, as a method for performing the clustering process relatively autonomously, a method is known wherein input image data is classified and sorted on a lattice space map. For this classification and sorting, for example, a self-organizing feature mapping (hereinafter abbreviated simply as "SOM") is used (T. Kohonen, Self-organizing formation of topologically correct feature maps, Biological Cybernetics, 1982). The SOM is a network having two layers of an input layer in which data is input and a competitive layer of a lattice space map. The input is weighted and input to each lattice. A group of weights for the input components is called a weight vector.

At first, the weight vector is initialized through the following process. As described in the Kohonen reference described above, a number of input vectors are selected at random from among a plurality of input vectors (corresponding to a feature set at this point) which is a target for learning, the number being identical to a number of prototypes, and the weight vectors for the lattices are initialized. Also according to Kohonen, it is also possible to randomly set initial values for the weight vectors.

Next, a learning process is performed for the weight vectors. During the learning steps, a feature set for learning is generated and a predetermined measured value (for example, Euclid distance) is calculated from the learning feature set and the weight vectors of lattices in the lattice space. From among the lattices, a lattice having the maximum correlation (minimum measure) is found (this lattice is called a "winning node"). For lattices located in the neighborhood of this lattice (winning node) in the lattice space, the weight vector of each of these lattices is adjusted such that the measured value between the learning feature set and the lattice is reduced. After repeating the learning process while adjusting the weight vectors in such a manner, lattices having minimum values with respect to a feature set made of features that are similar to each other become concentrated in a particular area, so that a condition can be obtained which can be applied for data classification. In this process, the selection of lattices in which the weight vectors are to be adjusted is made depending on the distance on the map from the winning node. It is preferable that the amount of adjustment be variable depending on the distance from the winning node c and the magnitude of the amount of adjustment also be changeable. In general, the weight vector w is adjusted based on the following equation (1) so that the vector becomes more similar to the weight vector I of a neighborhood node:

[Equation (1)]

$$w_j(t+1)=w_j(t)+h_{cj}[I(t)-w(t)] \quad (1)$$

wherein $$h_{cj} = \alpha(t) \cdot \exp\left[\frac{\|r_c - r_j\|^2}{2 \cdot (\sigma(t))^2}\right] \quad \text{[Equation 2]}$$

in which $\alpha(t)$ represents a parameter known as a learning coefficient which controls the magnitude of the amount of adjustment and $\sigma(t)$ represents a function referred to as a neighborhood function which determines the variation in the range for adjusting the weight vectors, both of which monotonically decreases with respect to time t. Adjustment according to equation (1) is performed for all lattices that belong in a range of an inter-node distance of Rmax on the map from the winning node wherein

[Equation 3]

$$\text{Rmax} \geq \|r_c - r_j\| \quad \text{(Equation (1c))}$$

With repetition of learning, the value of Rmax decreases as a result of influence of the neighborhood function $\sigma(t)$. As the neighborhood function $\sigma(t)$, a function such as a triangular type function, a rectangular (quadrangular) type function, and a Mexican hat type function can be used. It is also known that the selection of the neighborhood function $\sigma(t)$ also influences the learning results. The parameter "t" represents "time step" and is incremented every time a feature set is input. The factor $\|r_c - r_j\|$ represents a norm (distance) between the winning node and the node in which the weight vector is to be adjusted.

Simple application of the above technique, however, does not allow immediate execution of autonomous data classification. In order to realize autonomous data classification, the appropriateness of the lattice space map must be determined after completion of the learning process. In other words, (1) a method for obtaining an optimum lattice space map is required. In addition, when data is to be classified using the lattice space map after the learning process, it is appropriate to create, in the lattice space, boundaries which form the basis for classification and to classify data given as the classification target based on where the lattice having the minimum measure with respect to the feature set corresponding to the data is located relative to the boundaries (regions in the lattice space separated by the boundaries will be referred to simply as "clusters" hereinafter). That is, (2) a method for determining the boundaries of clusters is also required.

Among these required methods, as (1) a method for obtaining an optimum lattice space map, Kohonen proposes a method for selecting a map in which the average quantization error is minimum. That is, from among a plurality of lattice space maps formed using different learning conditions, a map having the minimum average quantization error is selected and is used as an approximated optimum lattice space map. In this method, the topology of the space of the input feature set is not reflected in the topology of the map.

In other words, the degree of preservation of topology is low. This may lead to erroneous classification depending on the method for clustering.

As a method which takes into consideration the preservation of topology, a technique for forming an appropriate map by monitoring a predetermined indication called a topological function (topographic function) to control the learning conditions (Auto-SOM) has also been developed. However, the calculation of the topographic function itself is a heavily loaded process, and therefore, there is a problem in that the learning time increases.

As (2) a method for autonomously determining the boundaries of clusters, a method known as a U-matrix method (Unified Distance Matrix Method) and a method known as a potential method are both under development. The U-matrix method is described in detail in A. Ultsch et al., "Know edge Extraction from Artificial Neural Networks and Applications", Proc. Transputer Anwender Treffen/World Transputer Congress TAT/WTC 93 Aachen, Springer 1993. In the U-matrix method, a sum of the absolute values of differences between the corresponding components of the weight vectors of the two lattices or the root-mean square of the differences is defined as the distance between two adjacent lattices on a map. With such a definition, the distance between adjacent lattices that are each strongly associated (that is, these lattices have weight vectors which are close to the feature set; these lattices will hereinafter be described as "prototyped to the feature set") with feature sets having a high similarity, that is, the distance between adjacent lattices that are prototyped to two feature sets having a high similarity, is small. In contrast, the distance between adjacent lattices that are each prototyped to two feature sets having a low similarity is large. Considering a three-dimensional surface with the height representing the magnitude of the distance, the height of a surface corresponding to a distance between lattices each prototyped to feature sets having a high similarity will be low and a "valley" is formed, whereas the height of a surface corresponding to a distance between lattices prototyped to feature sets having a low similarity will be high and a "hill" is formed. Therefore, by forming the boundaries along the "hills", it is possible to define a group (cluster) of lattices that are prototyped to feature sets having a high similarity. The U-matrix method can be considered as a method for compensating a disadvantage of the self-organizing map that the distance in the input space is not preserved.

The U-matrix method, however, suffers a problem in that although it is possible to define the boundaries when the height differences between the "hills" and "valleys" are significant, in many actual information processes, the height differences between the "hills" and "valleys" are not as significant as desired, and the height of the three-dimensional surface varies rather gradually. In such cases, manual setting of the boundaries is necessary. Therefore, the U-matrix method in some cases does not allow autonomous determination of boundaries.

The "potential method" is disclosed in D. Coomans, D. L. Massart, Anal. Chem. Acta., 5-3, 225–239 (1981). In the potential method, a probability density function of a population which approximately represents input data is estimated using a predetermined potential function and by superposing a value of a function corresponding to input data, and the regions where the amount of superposition is small are determined as the boundaries. As the potential function, a Gaussian type function is commonly used. More specifically, for a group of input data made of N input vectors each having K dimensions, average potentials received by first input data from the other input data (contribution of the first input on the overall input group) $\psi_l$ is defined using the following equations (2) and (3).

[Equation 4]

$$\Psi_l = N^{-1} \sum_{g=1}^{N} \Phi_{l,g} \quad (2)$$

$$\Phi_{l,g} = [(2\pi)^{K/2} \cdot \alpha^K]^{-1} \exp\left[-(2\alpha^2)^{-1} \sum_{k=1}^{K} (x'_{kl} - x'_{kg})^2\right] \quad (3)$$

wherein $$x'_{kl} = \frac{(x_{kl} - \bar{x}_k)}{\sigma_k}, \bar{x}_k = N^{-1} \sum_{l=1}^{N} x_{kl}, \sigma_k = \left[\sum_{l=1}^{N} (x_{kl} - \bar{x}_k)^2 (N-1)\right]^{1/2}$$

In these equations, $x_{k1}$ represents a k-th component of the first input and $\alpha$ represents a smoothing parameter which affects the number of clusters to be classified. Therefore, in the potential method, optimization of distribution function for which the distribution shape is to be assumed and optimization of various parameters are required for each input vector group, that is, knowledge concerning the characteristics of the data to be classification is required in advance, and manual adjustment is therefore required. In addition, in the potential method, as the dimension of the feature set obtained from the input data becomes higher, more samples will be required for determining the appropriate probability density distribution, and therefore the potential method suffers from a problem in that it is difficult to apply the method to a map having only a small number of lattices. In other words, the potential method also does not always ensure autonomous determination of boundaries.

To solve the above-described problems, various techniques have been studied, such as the techniques disclosed in Japanese Patent Laid-Open Publication No. Hei 7-234854, Japanese Patent Laid-Open Publication No. Hei 8-36557, and "Unsupervised Cluster Classification using Data Density Histogram on Self-organizing Feature Map", papers of the Institute of Electronics, Information, and Communication Engineers, D-II Vol. J79 -DII No. 7, pp. 1280–1290, July, 1996. However, each of these techniques presumes that the features to be used for the classification are prototyped to lattices with sufficient distance either in the structure of the input data or in the mapping results. When there is variation in a difference between or an overlapping of distribution shapes for each feature to be classified or in the distance between center of masses of the positions on the map of lattices which are prototyped to the feature, which are common to image data classification, for example, the boundaries of clusters become mingled in a complicated manner on the map and appropriate clustering process cannot be performed.

In addition, in the related art methods, the number of lattices on the map is determined through research and experience in, and there has been no consideration regarding selection of an appropriate number of lattices suitable for actual usage. However, when the number of lattices is less than an appropriate number, there are some cases where the lattices in the section of the cluster boundaries become strongly associated with a feature set which should belong to another cluster, in which case classification error tends to occur more frequently. For this purpose, a technique for increasing or decreasing the number of lattices such that the average quantization error becomes lower than a predetermined number is disclosed in James S. Kirk et al., "A Self-Organized Map with Dynamic Architecture for Efficient Color Quantization", IJCNN'01, 2128–2132. In this technique, however, lattices that image data distribution in the space of a feature set corresponding to the input data are added and the like, and there is no consideration for increasing, for example, the number of lattices in the neighborhood of the cluster boundaries, which is important in data classification. As such, it is also possible to increase the number of lattices from the beginning of the process, but this configuration inevitably leads to an increase in calculation time, and therefore, is not practical.

SUMMARY OF THE INVENTION

An advantage of the present invention is that a data classifier is provided which operates autonomously and which takes into consideration the number of prototypes on a map.

According to one aspect of the present invention, there is provided a data classifier for classifying input data by using a result of a learning process based on the input data and using a self-organizing map, the classifier comprising means for forming, through learning, a plurality of self-organizing maps corresponding to a plurality of learning parameters, and means for evaluating each of the plurality of learning-formed self-organizing maps and adjusting the learning parameters based on the result of the evaluation, wherein a learning formation process of a self-organizing map is repeated using the adjusted learning parameters.

According to another aspect of the present invention, there is provided a data classifier comprising mapping means for adjusting coupling weights between a plurality of prototypes in a map space using a plurality of input data and forming a prototype map through learning; and clustering means for calculating a predetermined measure (using calculations to obtain a defined measured value) defined between each prototype and classifying the prototypes into a plurality of clusters based on the measure, wherein the prototype map classified into clusters is supplied for a data classification process. According to another aspect of the present invention, it is preferable that, in the data classifier, the measure is calculated as a value of a function which rapidly and asymptotically approaches 0 from a predetermined differential value as the degree of similarity between prototypes decreases, and the cluster to which the observatory prototype belongs is determined using the measure obtained as the value of the function.

According to another aspect of the present invention, it is preferable that, in the data classifier, the clustering means provisionally determines clusters to which each prototype belongs; the clustering means calculates, for each cluster, a measure between at least one prototype belonging to the cluster and an observatory prototype to be classified into a cluster, and the clustering means determines the cluster to which the observatory prototype belongs based on the calculated measure.

According to another aspect of the present invention, it is preferable that, in the data classifier, (a) the clustering means provisionally determines clusters to which the prototypes belong; (b) the clustering means sequentially selects each prototype as an observatory prototype to be classified into a cluster; (c) the clustering means calculates, for each cluster, a measure between at least one prototype belonging to the cluster and the observatory prototype; (d) the clustering means changes, as necessary, the cluster to which the observatory prototype belongs based on the calculated measure, and the processes of (b), (c), and (d) are repeated until there is no change in the cluster to which each prototype belongs so that each prototype is classified into a cluster. According to another aspect of the present invention, it is preferable that, in the data classifier, a parameter used for the measure calculation is determined based on a distribution of an occurrence frequency of a degree of similarity between prototypes.

According to another aspect of the present invention, it is preferable that, in the data classifier, the learning formation of prototype map is achieved through a self-organizing mapping. According to another aspect of the present invention, it is preferable that the data classifier further comprises means for forming, through learning, a plurality of self-organizing maps corresponding to a plurality of learning parameters, and means for evaluating each of the plurality of learning-formed self-organizing maps and adjusting the learning parameters based on the result of the evaluation, wherein a learning formation of a self-organizing map is again performed with the adjusted learning parameters. According to another aspect of the present invention, it is preferable that, in the data classifier, the evaluation of the self-organizing maps is performed based on a phase relationship between a feature space for input data and a prototype map space and on an average quantization error of the prototype map.

According to another aspect of the present invention, it is preferable that, in the data classifier, a self-organizing map comprises a plurality of prototypes and the classifier further comprises means for forming, after each prototype is classified into a cluster, at least one new prototype in the boundary section of clusters. Here, a further classification process for the new prototype into a cluster may be executed. According to another aspect of the present invention, it is preferable that, in the data classifier, when the new prototype is formed, an additional learning process is executed for the new prototype. According to another aspect of the present invention, it is preferable that, in the data classifier, the new prototype is formed based on a statistical calculation for prototypes present in the neighborhood of the boundaries. According to another aspect of the present invention, it is preferable that, in the data classifier, the new prototype is formed in portions wherein a density of input data referred to by the prototypes is lower than a predetermined threshold value. According to another aspect of the present invention, it is preferable that, in the data classifier, the new prototype is formed in a boundary section of clusters and in portions wherein a density of input data referred to by the prototypes present in that section is lower than a predetermined threshold value.

According to another aspect of the present invention, there is provided a method for classifying data by executing a learning process based on input data using a self-organizing map and classifying data using the learning result, the method comprising the steps of forming, through learning, a plurality of self-organizing maps corresponding to a plurality of learning parameters; and evaluating each of the plurality of learning-formed self-organizing maps and adjusting the learning parameters based on the evaluation result, wherein a self-organizing map is again formed through learning with the adjusted learning parameters.

According to another aspect of the present invention, there is provided a method for classifying data, comprising the steps of a mapping step for forming, through learning, a prototype map by adjusting coupling weights between a plurality of prototypes in a map space according to a plurality of data inputs, and a clustering step for calculating a predetermined measure defined between each prototype and classifying the prototypes into a plurality of clusters based on the measure, wherein the prototype map classified into clusters is supplied for a data classification process.

According to another aspect of the present invention, it is preferable that the method for classifying data further comprises the step of forming, after each prototype is classified into a cluster, at least one new prototype in the boundaries of the clusters. According to another aspect of the present invention, it is preferable that, in the method for classifying data, in the mapping step, a plurality of learning parameters are used for the learning formation of a plurality of prototype maps corresponding to the learning parameters, each of the plurality of learning-formed prototype maps is evaluated, the learning parameters are adjusted based on the evaluation result, and the learning formation of a prototype map is again performed with the adjusted learning parameters. According to another aspect of the present invention, it is preferable that, in the method for classifying data, the evaluation of maps is executed based on a phase relationship between a feature space for the input data and a prototype map space and on an average quantization error of the prototype map.

According to another aspect of the present invention, there is provided a data classifying program which instructs a computer to execute a process to perform learning based on input data using a self-organizing map and to classify data using the results of the learning, the program instructing a computer to execute the steps of forming, through learning, a plurality of self-organizing maps corresponding to a plurality of learning parameters; and evaluating each of the plurality of learning-formed self-organizing maps and adjusting the learning parameters based on the evaluation results, wherein a learning formation process for a self-organizing map is again performed with the adjusted learning parameters.

According to another aspect of the present invention, there is provided a data classifying program which instructs a computer to execute the steps of a mapping procedure for adjusting coupling weights between a plurality of prototypes in a map space using a plurality of input data and for forming a prototype map through learning, and of a clustering procedure for calculating a predetermined measure defined between each prototype and for classifying the prototypes into a plurality of clusters based on the measure, wherein the prototype map classified into clusters is supplied for a data classification process.

According to another aspect of the present invention, it is preferable that the data classifying program further instructs a computer to execute the step of a procedure for forming, after each prototype is classified into a cluster, at least one new prototype in the boundaries of clusters. According to another aspect of the present invention, it is preferable that, in the data classifying program, in the mapping procedure, a plurality of learning parameters are used to form, through learning, a plurality of prototype maps each corresponding to each learning parameter, each of the plurality of learning-formed prototype maps is evaluated, the learning parameters are adjusted based on the result of evaluation, and the learning formation of a prototype map is again performed with the adjusted learning parameters. According to another aspect of the present invention, it is preferable that, in the data classifying program, the map evaluation is performed based on a phase relationship between a feature space for input data and a prototype map space and on an average quantization error of the prototype map.

BRIEF DESCRIPTION OF THE DRAWINGS

FIG. 6 is an explanatory diagram showing an example operation of the clustering process.

FIG. 7 is an explanatory diagram showing an example result of clustering in a prototype map.

DESCRIPTION OF PREFERRED EMBODIMENT

A preferred embodiment of the present invention will now be described with reference to the drawings. In the following description, the embodiment is illustrated using an example wherein image data is classified, but the present invention is not limited to image data classification and can also be applied to classification of data from other sensory organs, such as taste data, or to measurement data such as experimental results.

Figure 1:
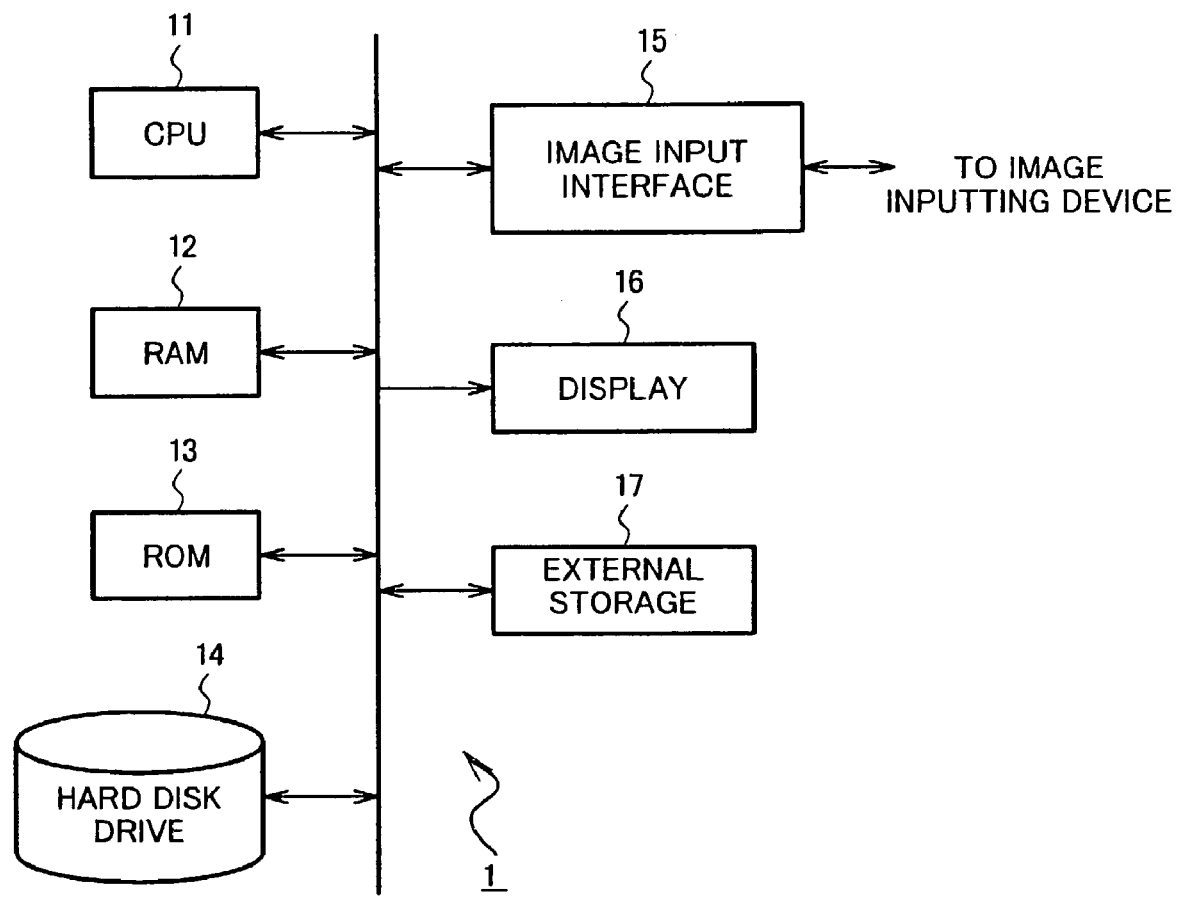
FIG. 1 is a block diagram showing a structure of a data classifier according to a preferred embodiment of the present invention.

As shown in FIG. 1, a data classifier according to the preferred embodiment of the present invention comprises a CPU 11, a RAM 12, a ROM 13, a hard disk drive 14, an interface 15 for image input, a display 16, and an external storage 17 which are connected to each other via a bus. In other words, the data classifier 1 according to the embodiment is realized as a software classifier operating on commonly used personal computers. This software can be stored and distributed in storage media such as CD-ROMs and DVD-ROMs, or, alternatively, may be downloaded through a network (a connection interface for the network is not shown). When the software is distributed on the storage media, the software is read at the external storage 17 and stored in the hard disk drive 14 through a predetermined installation procedure. When the software is downloaded through a network, the software is installed to the hard disk drive 14 in a similar manner.

CPU 11 operates according to a program stored in the hard disk drive 14 and generally executes a data classification program or the like for realizing the data classifier 1 of the embodiment under a control of an operating system such as Microsoft Windows (trademark). More specifically, a data classification program according to the embodiment comprises a map generator 21 and a cluster boundary determiner 22. The map generator 21 comprises an SOM learner 31, a map selector 32, a learning condition setter 33, and a prototype adder 34. Here, each component is realized as a software module, but each component may alternatively be realized as a hardware such as a logical circuit. The processes at the CPU 11 will be described in more detail later.

The RAM 12 is utilized as a work memory for the CPU 11 and stores various parameters and data while the CPU 11 is in operation. The ROM 13 primarily stores programs required for activating the data classifier, such as a program for reading process of the operating system. These activation programs are well known in the art and will not described in detail.

On the hard disk drive 14, the main portion of the operating system and various programs are installed. In the embodiment, as described above, the data classification program is also installed to the hard disk drive 14. Although embodiment is described exemplifying a case wherein the data classification program is installed on the hard disk drive, it is also possible for the data classification program to be installed on an SRAM (Static Random Access Memory) or a nonvolatile memory such as EEPROM. In addition, the program need not be installed in the same casing as the CPU 11, and may be installed to another computer which is connected via a network interface (not shown).

An image inputting device such as a scanner is connected to the image input interface 15. The image input interface 15 receives image data input from the image inputting device and outputs the image data to the CPU 11. The display 16 displays an image according to instructions from the CPU 11.

[Details of Process]

Figure 2:
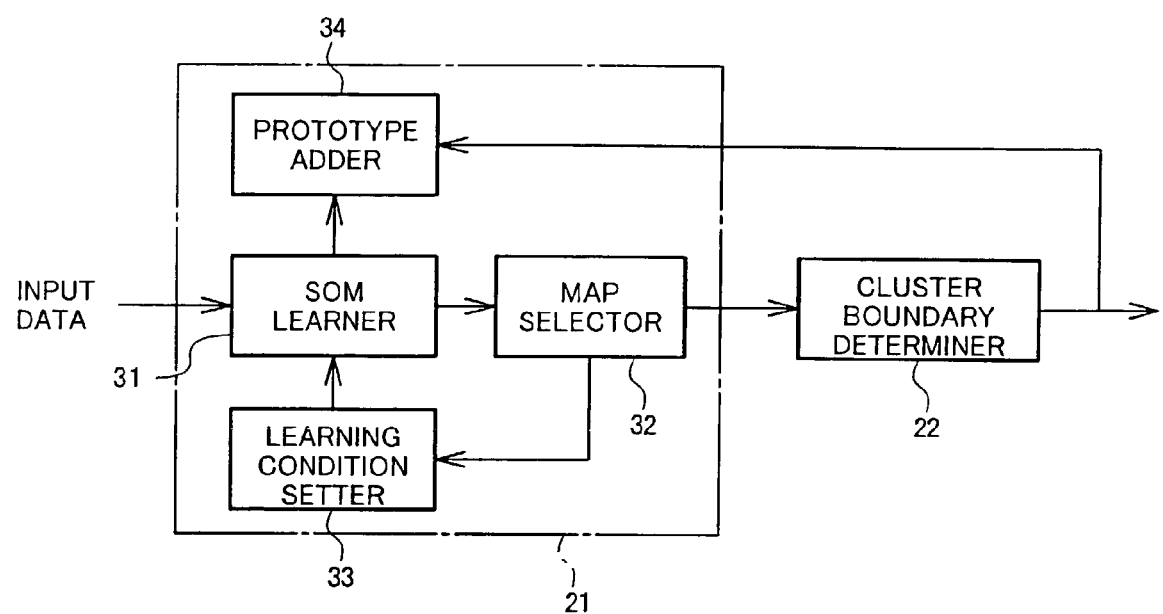
FIG. 2 is a block diagram showing a structure within a data classifier according to the preferred embodiment of the present invention.

Details of the data classification program to be executed by the CPU 11 will now be described with reference to FIG. 2. The map generator 21 creates a prototype map, for example, through a self-organizing mapping (SOM) as described above and outputs information on the created prototype map to the cluster boundary determiner 22. The cluster boundary determiner 22 operates on the prototype map input from the map generator 21 and classifies prototypes into clusters. Each of these components will now be described separately and in detail.

[Map Generation]

The SOM learner 31 of the map generator 21 first generates a plurality of (for example, M wherein M is an integer greater than or equal to 2) candidates for a prototype map corresponding to each of M sets of learning conditions input from the learning condition setter 33. Each map candidate is prepared by associating, to information specifying each prototype, information on relative weighting of the prototype and each of the components of a feature set. In the embodiment, the prototypes composing the map need not necessarily be arranged as lattice points (in this case, the information specifying a prototype may include coordinate information of the prototype on the map), although in the following description, the prototypes are described as being arranged as lattice points in order to simplify the description.

The map selector 32 calculates a quantization error (hereinafter abbreviated as "QE") and topological product (hereinafter abbreviated as "TP") for each map candidate and selects a map suitable for cluster determination as a champion map based on these parameters. The quantization error is calculated according to the following equation (4).

[Equation 5] (4)

$$QE_i = \frac{1}{P}\sum_{j=1}^{P} \|E_j - W_{ct}\|$$

In the equation (4), P represents the number of feature sets used for map learning (that is, the number of learning patterns), Ej represents a j-th vector of the feature set, Wc represents the weight vector of the winning node for the j-th vector of the feature set. The quantization error is well known, for example, from Kohonen, and will not be described in detail.

TP is calculated according to the following equation (5).

[Equation 6] (5)

$$TP = \frac{1}{N(N-1)}\sum_{j=1}^{N}\sum_{k=1}^{N-1} \log(T(j,k)) \text{ wherein}$$

$$T(j,k) = \left(\prod_{l=1}^{k} Q_1(j,l)Q_2(j,l)\right)^{\frac{1}{2k}}$$

$$Q_1(j,k) = \frac{d(w_j, w_{j(k,A)})}{d(w_j, w_{j(k,V)})}$$

$$Q_2(j,k) = \frac{d(r_j, r_{j(k,A)})}{d(r_j, r_{j(k,V)})}$$

Here, rj represents the coordinate of node j in the SOM competitive layer, j(k,A) represents a k-th closest node from a node j in a competitive layer A, d(i,j) represents a Euclid distance between nodes i and j, wi represents a weight vector for a node i in the SOM competitive layer, and j(k,V) represents a k-th closest node from node i in terms of the Euclid distance of the weight vector.

The TP becomes smaller as the relative positional relationship between the space in the input layer (feature set space) and the space in the competitive layer (prototype space) becomes more similar, as detailed by Bauer et al. in, for example, Bauer, H. U., and Pawelzik, K. R., (1992), "Quantifying the neighborhood preservation of self-organizing feature maps." IEEE Trans., Neural Networks, 3, 570–579.

The map selector 32 utilizes the QE and TP, and selects, as the champion map MAPc, a map having a minimum score value as calculated using the following equation (6) and outputs the selection result.

[Equation 7] (6)

$$\left(\frac{|TP_i|}{TP^*}\right)\times\left(\frac{QE_i}{QE^*}\right)$$

Here, TP* represents a median of the absolute values of TPi, that is, TP*=median{|TP|, ... |TPM|}. Similarly, QE* can be represented as QE*=median{|QE|, ... |QEM|}. That is, $$MAP_c = \min_i\left\{\left(\frac{|TP_i|}{TP^*}\right)\times\left(\frac{QE_i}{QE^*}\right)\right\}$$ [Equation 8]

The map selector 32 does not immediately output the selection result of the champion map to the cluster boundary determiner 22 provided in downstream of the map selector 32, but instead outputs at least one signal to the learning condition setter 33. After repeating this process a predetermined number of times, the map selector 32 then outputs the selection result at that point to the cluster boundary determiner 22.

The learning condition setter 33 outputs, for example, M sets of data, each set including a number of input data for learning N (number of repetitions of learning), a neighborhood distance σ(t), and a learning coefficient α(t). The learning condition setter 33 initially determines these values and a function (N, σ(t), α(t)) based on random parameters or as a set which is determined in advance (hereinafter referred to simply as "preset"). The learning condition setter 33 also receives an input of selection result of the champion map from the map selector 32 and extracts a set of learning conditions corresponding to the selected map candidate. Using the extracted set of learning conditions as a basis, the learning condition setter 33 creates and assigns M sets of learning conditions and outputs these to the SOM learner 31.

The prototype adder 34 is provided for adding a prototype to a predetermined position on the prototype map after the cluster boundaries are determined to allow a further learning process. This component will be described in more detail later as this component is also associated with the operation of the cluster boundary determiner 22.

The learning operation at the map generator 21 will now be described. Initially, the learning condition setter 33 produces and outputs a plurality of sets (for example, M sets) of learning conditions based on parameters which are set randomly or determined in advance. The SOM learner 31 generates M candidates for a prototype map (map candidates) each corresponding to each learning condition set output from the learning condition setter 33 and outputs the map candidates to the map selector 32. The map selector 32 selects, from among the map candidates, a map in which the learning conditions are preferable for the clustering process using both the quantization error and TP (champion map), and outputs the selection result to the learning condition setter 33. The learning condition setter 33 creates a plurality of sets of new learning conditions based on the learning conditions used for creating the champion map, and again outputs the created sets of learning conditions to the SOM learner 31 for creating another plurality of map candidates.

In this manner, the steps of creation of map candidates, selection of a champion map, and resetting of learning conditions are repeated a predetermined number of times, and a resulting champion map is output to the cluster boundary determiner 22 as a map in which the cluster boundaries are to be set (hereinafter referred to as a "boundary setting map").

[Determination of Cluster Boundaries]

Figure 3:
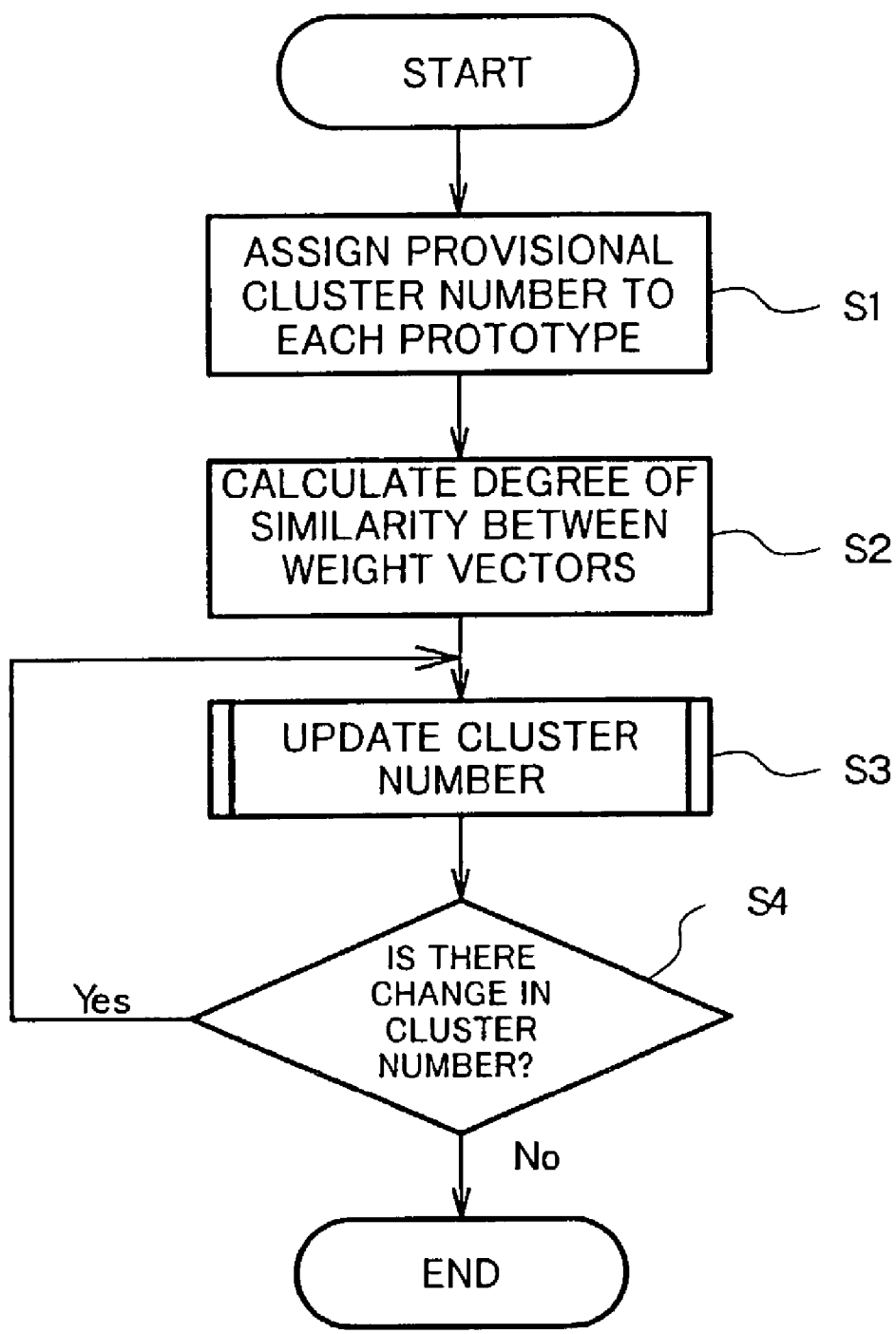
FIG. 3 is a flowchart showing a clustering process.

The cluster boundary determiner 22 executes processes as exemplified in FIG. 3 using the map input from the map generator 21 as the boundary setting map. More specifically, the cluster boundary determiner 22 assigns a unique number to each of prototypes contained in the input map and generates a provisional clustering result (S1). These numbers may be assigned by assigning numbers from "1" to "P" (with the number of prototypes being P) in a predetermined order. These numbers represent provisional cluster numbers. In other words, initially, the prototypes are classified into clusters which differ from each other.

Then, the cluster boundary determiner 22 chooses a prototype pair and calculates a degree of similarity between the weight vectors of the prototypes in the chosen prototype pair (S2). The result of this calculation is stored in the RAM 12 as a table for degree of similarity. A "prototype pair" referred to herein includes prototype pairs obtained by sequentially selecting a prototype as an observatory prototype and combining the observatory prototype with all of the other prototypes, that is, all combinations of two prototypes. In addition, as the degree of similarity referred to herein, a squared sum (distance) of the differences for the corresponding components of the weight vectors is used.

Figure 4:
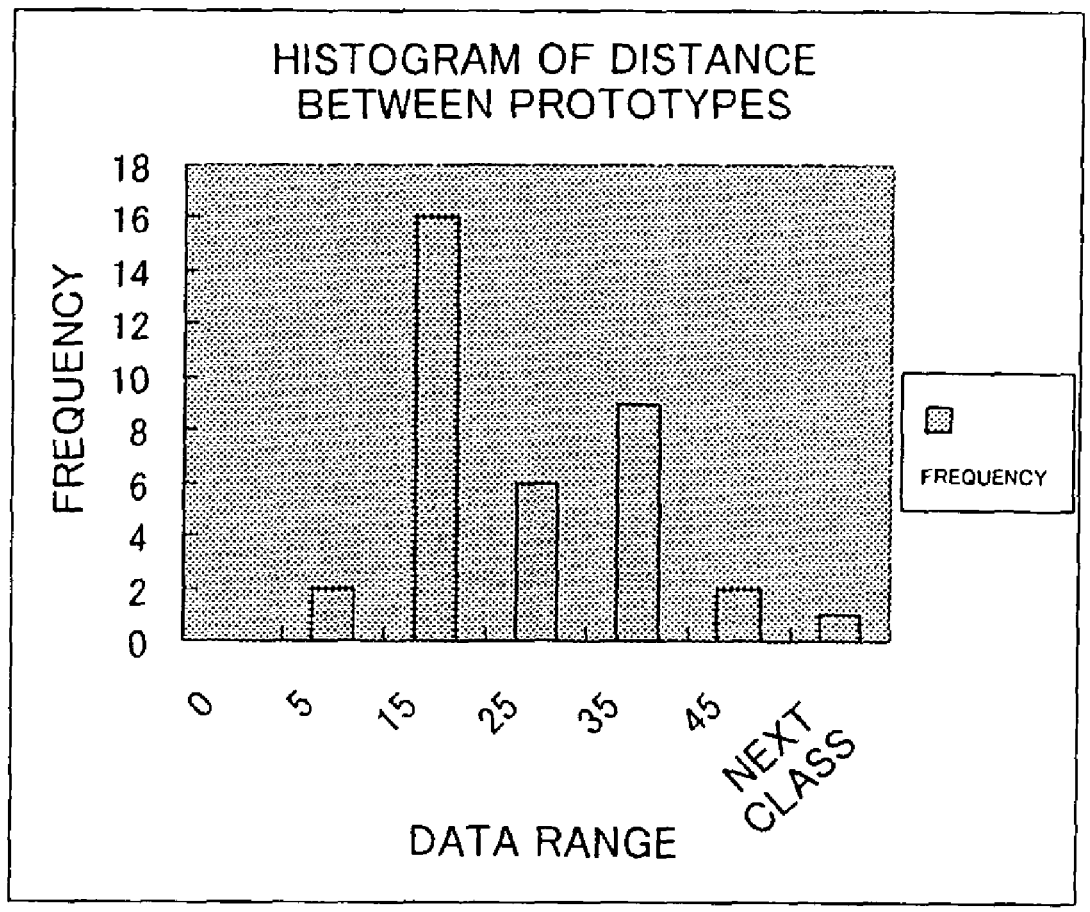
FIG. 4 is an explanatory diagram showing an example detection of histogram of distance between prototypes.

The degree of similarity is classified into classes each having a predetermined range of numerical values, and information on occurrence frequency for each class is generated (FIG. 4). A distance wherein the occurrence frequency is the maximum is set as Cd and a predetermined minute amount δ which is close to "0" is determined, or, alternatively, a distance which is shorter than the distance where the occurrence frequency is maximized and which is a maximum of where the occurrence frequency changes from decreasing to increasing may be set as Cd.

Figure 5:
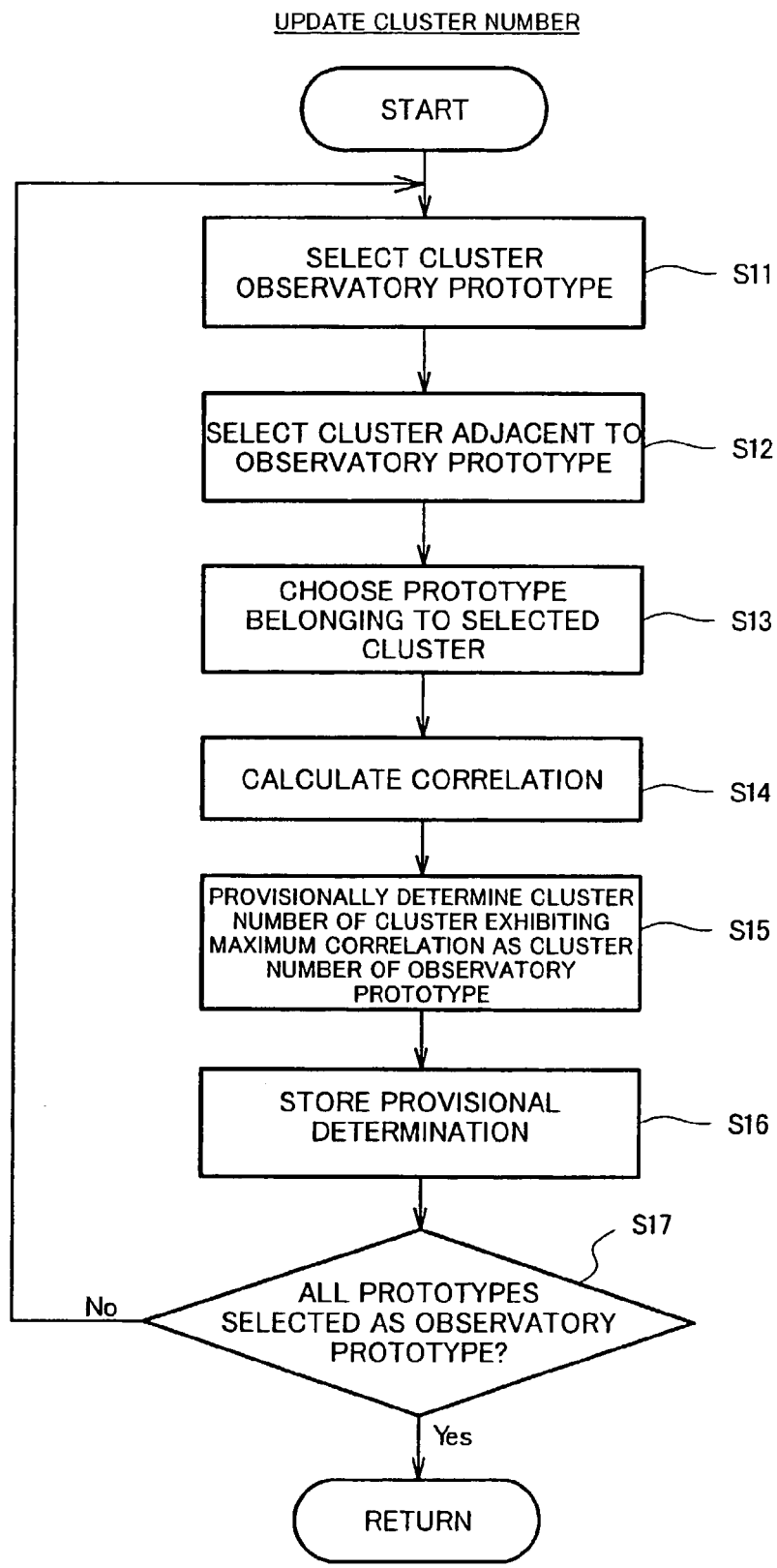
FIG. 5 is a flowchart showing an example update process in the clustering process.

Next, a process for updating the cluster numbers is started (S3). The cluster number update process is as shown in FIG. 5. In order to simplify the description, the process is explained here using an example wherein a 3×3 lattice map is used as the prototype map for which the cluster boundaries are to be determined. Initially, for the prototype map, unique numbers of "1" through "9" are assigned to 3×3=9 prototypes as shown in the a-state of FIG. 6 at the process S1.

The cluster boundary determiner 22 sequentially selects a prototype as an observatory prototype (S11). Then, the cluster boundary determiner 22 selects a cluster to which a prototype adjacent to the observatory prototype belongs (within a predetermined distance on the prototype map for which cluster boundaries are provisionally determined) (S12) and chooses the prototype which belongs to the selected cluster (S13).

In the example shown in FIG. 6, for example, the "1" on the left bottom is selected as the observatory prototype, and for each of the adjacent cluster numbers "1", "4", "5", and "2", prototypes that belong to each cluster are selected. Then, the cluster boundary determiner 22 calculates correlation between each prototype belonging to the clusters selected in process S12 and the observatory prototype as a measure using the following equation (7) (which is a function rapidly and asymptotically approaching "0" from a predetermined differential value with the decrease in the degree of similarity) (S14) and determines the cluster to which the observatory prototype belongs based on the correlation.

[Equation 9] (7)

$$F(c) = \frac{\sum_{i \in X(c)} e^{-\alpha \|y^* - y_k\|^2}}{\sum_{j \in X} e^{-\alpha \|y^* - y_j\|}} \text{ wherein}$$

$$\alpha = -\frac{Ln(\delta)}{Cd}$$

In equation (7), $y^*$ represents the weight vector of the observatory prototype, $y_i$ represents the weight vector of the i-th prototype, and X represents a group of prototype vectors with $X(c)$ representing the group of prototype vectors in cluster number c, the parameters Cd and δ used for determining α is obtained at the process S2, and Ln represents the natural logarithm. In other words, in equation (7), the sum of the distances between the observatory prototype and the prototypes belonging to the cluster having the cluster number of c is divided by the overall average. Equation (7) therefore represents correlation between the observatory prototype and the cluster c, and exhibits a larger value for a cluster c which includes a larger number of prototypes having weight vectors with large correlation with the weight vector of the observatory prototype.

The cluster boundary determiner 22 provisionally determines, as the cluster number of the observatory prototype, the number of cluster which exhibits the maximum value for equation (7) (S15) and stores the provisional determination (S16).

When the prototype classified into the cluster "1" in the a-state of FIG. 6 is the observatory prototype, for example, as an adjacent prototype, initially no prototype other than the observatory prototype belongs to cluster "1" and no calculation is performed regarding cluster "1". Correlations between the observatory prototype and prototypes belonging to cluster "4", between the observatory prototype and prototypes belonging to cluster "5", and between the observatory prototype and prototypes belonging to cluster "2" are calculated, and when, for example, the shortest distance is observed between the observatory prototype and the prototype belonging to the cluster "4", the cluster to which the observatory prototype belong is changed from cluster "1" to cluster "4" (b-state in FIG. 6). It is also possible to perform the correlation calculations with all prototypes instead of performing the calculations with the adjacent prototypes. With such a configuration, it is possible to gather prototypes that are farther away on the prototype map, but which have relatively short distances in terms of the weight vectors. However, as this configuration requires longer period of time, in the embodiment, a map has been selected in which the distances on the prototype map are not too far different from the distances in terms of the weight vectors by considering evaluation using TP in advance.

The cluster boundary determiner 22 then checks whether all prototypes have been selected as an observatory prototype (S17), and if there is any prototype which has not been selected (if No), the process returns to S11 and continues from there. If it has been determined at process S17 that all prototypes have been selected (if Yes), the update process of the cluster number is completed.

The cluster boundary determiner 22 returns to the process shown in FIG. 3 and compares the provisional determination with the cluster numbers before the update process to check whether or not there had been any change in the cluster numbers (whether or not the cluster numbers have been converged) (S4). If there has been any change (if Yes), the process S3 is repeated using the provisional determination as a new provisional clustering result. If it has been determined that there has been no change (if No) in the process S4, that is, if the cluster numbers are converged, the cluster boundary determiner 22 outputs the obtained clustering results.

[Addition of Prototype]

A feature of the embodiment is that the clustering boundary determiner 22 does not immediately output the clustering result as the final result, but rather the clustering boundary determiner 22 can generate at least one output to the prototype adder 34 of the map generator 21. The prototype adder 34 creates a new prototype in the section of boundaries of the clusters by referring to the clustering result and outputs, to the SOM learner 31, a prototype map after the new prototype is added so as to allow a further learning process. This further learning is targeted for fine adjustment, and therefore if, for example, the learning conditions for the learning process before clustering are set as $\alpha(t)=0.2$, $\sigma(t)=2.0$, and 10000 learning steps for 700 patterns, the learning process after the new prototype is added can have, for example, learning conditions such as $\alpha(t)=0.002$, $\sigma(t)=1.0$, and 100 repetition of pattern input.

More specifically, when, for example, the cluster boundary determiner 22 outputs a clustering result as shown in the c-state of FIG. 6 for a prototype map which is provisionally clustered initially as the a-state of FIG. 6, a new prototype is formed at the boundary between clusters "4" and "6" (d-state of FIG. 6). In d-state of FIG. 6, the previous clustering results are shown in parentheses to facilitate the understanding, but these previous clustering results are meaningless after the prototype has been added.

The new prototype need not be added in the entire region along the cluster boundaries and may instead be added in at least a portion along the cluster boundaries. In this case, it is preferable to determine the portion to which a prototype is to be added based on the number of instances (number of patterns) in which the portion became a closest-neighboring prototype having the shortest distance with respect to the learning input vector (pattern). In learning methods such as SOM learning and VQ learning, the density of prototypes at the central section of a cluster is large and the density of the prototypes is small near the cluster boundary such that the clusters can be used in the U-matrix method. Therefore, for a portion which has a relatively small number of opportunities, a number less than a predetermined threshold value, to become a closest-neighboring prototype with respect to the learning input pattern, that is, a portion where the density of the prototypes is less than a predetermined threshold value, it is possible to assume that the portion is a prototype near the boundary of the clusters. By adding a new prototype to this portion, it is possible to avoid adding new prototypes over the entirety of the boundary, and the efficiency for the re-learning and re-clustering processes can be improved.

The weight vector of the new prototype to be added is determined using a predetermined statistical calculation result (for example, arithmetic mean) with respect to weight vectors of already-existing prototypes near the position to which the new prototype is to be added (for example, the boundary).

[Operation]

Next, an operation of a data classifier 1 according to the embodiment will be described. First, the learning condition setter 33 outputs a plurality of sets of learning condition parameters S1, S2, . . . , SM and the SOM learner 31 generates a number of prototype maps, the number corresponding to the number of sets of the learning condition parameters (in this case, M). The SOM learner 31 generates a predetermined feature vector based on learning image data input from outside and adjusts coupling weights between each prototype in each prototype map and each component in the feature vector. This operation of the SOM learner 31 is well known from, for example, Kohonen et al. As the learning image data, image data of a target intended for later classification such as, for example, image data relating to "eye" or image data relating to "nose" may be used.

The plurality of prototype maps generated by the SOM learner 31 are output to the map selector 32. Based on quantization error (QE) and topological product (TP) determined through calculations relating to the prototypes included in each map, the map selector 32 selects a map in which the quantization error is small and the matching of the relative positional relationship, indicated by TP, between the space of input layer (feature set space) and the space of competitive layer (prototype space), that is, the matching between the distance between weight vectors and the distance in the competitive layer is high. With such selection, the distance on the map between prototypes which are sensitive to similar image data can be reduced.

Then, based on the set of learning condition parameters used for learning in the selected map, the learning condition setter 33 again generates a plurality of sets of learning condition parameters and outputs to the SOM learner 31. A plurality of maps are again generated and the map selection process based on QE and TP is again performed. In this manner, the learning condition parameters are recursively adjusted and the formation through learning (learning formation) of maps is recursively performed.

The cluster boundary determiner 22 operates on a map obtained through the recursive learning as described, sequentially selects a prototype on the map, and collects in a cluster the selected prototype and adjacent prototypes which have a large correlation with the selected prototype. In other words, the cluster boundary determiner 22 determines a cluster to which each prototype belongs based on the positional relationship on the map between the prototypes and the correlation between the prototypes. This process is repeated until the clustering result converges. When the clustering result converges, the clustering boundary determiner 22 outputs the converged clustering result to the prototype adder 34.

The prototype adder 34 generates a map to which a new prototype is added in the boundary portion of the clusters and outputs the generated map to the SOM learner 31 which then sets predetermined learning conditions and re-executes the learning process. In this process, only one set of learning condition parameters is required, and therefore, only one map is necessary. After the learning process for the map is completed, the map is output to the cluster boundary determiner 22 (without passing through the map selector 32) and the cluster boundary determiner 22 re-executes the clustering process.

The map obtained as a result of this clustering process is supplied for use in the classification process. In other words, a feature vector is generated for image data input as the classification target and a prototype which has the largest coupling weight with respect to the feature vector (a prototype which is sensitive to the input image data) is found. The cluster number of the cluster to which this prototype belongs is assigned as the classification number for the image data. In this manner, a specific classification number is determined for image data which are similar to each other (for example, image data relating to "eye"), and different classification numbers are determined and output for image data which differ from each other (for example, image data relating to "eye" and image data relating to "nose"). The result of this classification is displayed on the display 16 and is printed using a printer or the like (not shown).

As described, according to the present embodiment, it is possible to realize autonomous learning and clustering processes without manual setting of parameters. In addition, if the number of prototypes is insufficient, a prototype is autonomously added at the boundary portion of the clusters and learning and classification processes with appropriate number of prototypes are executed.

SPECIFIC EXAMPLE

Figure 7:
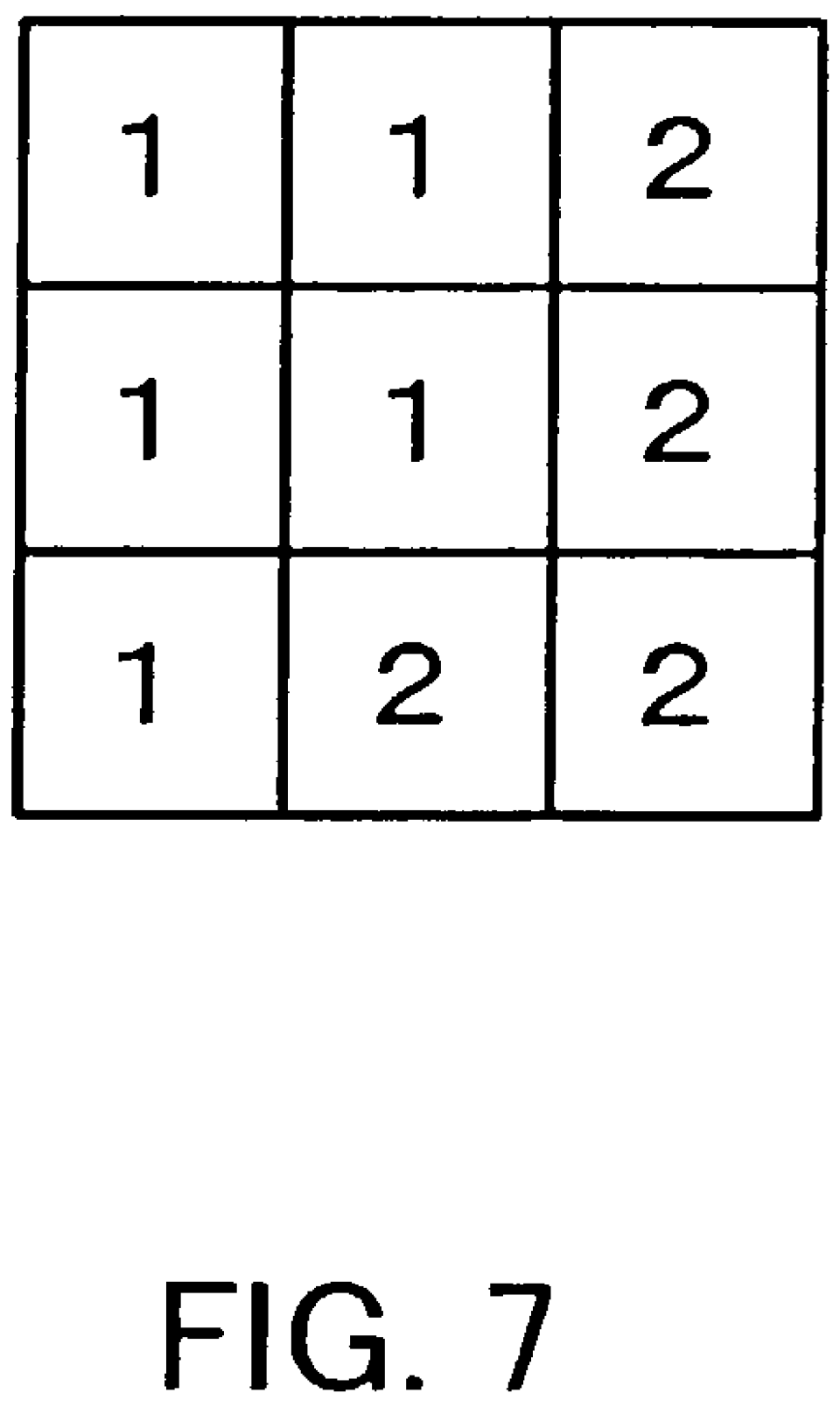

An example of addition of a new prototype according to the present embodiment will now be described. 700 image data to be classified into two categories, "eye" and "nose", were prepared and a learning process was performed using a prototype map having 3×3=9 prototypes. For simplicity, one set of learning condition parameters was used (and therefore one map was used) with the parameters set at $\alpha(t)=0.2$, $\sigma(t)=2.0$, and 10000 repetition for SOM learning using the 700 patterns. As a result of cluster boundary determination for a prototype map obtained with the above conditions, cluster boundaries as shown in FIG. 7 were formed. A data classification process was performed using this map, and it was found that 15 patterns from among the 700 patterns were erroneously classified.

Figure 8:
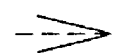
FIG. 8 is an explanatory diagram showing an example prototype addition process and example results of clustering after addition of prototypes.

Then, new prototypes were added as shown in the a-state in FIG. 8 on the cluster boundary (represented by "New" in FIG. 8), and an additional learning process was performed with $\alpha(t)=0.002$, $\sigma(t)=1.0$, and a repetition number of pattern input of 100. The clustering boundary determination process was again executed and a clustering result as shown in the b-state of FIG. 8 was obtained. The number of erroneous classification of data according to a data classification process using this resulting map was 0. The weight vectors of the prototypes in the boundary portion were carefully studied and it was found that there was no closest-neighboring prototype for both "eye" and "nose" which are the classification targets.

In another example, cluster boundaries were determined using a map having 3×4=12 prototypes from the beginning through SOM learning with the learning condition parameters being $\alpha(t)=0.2$, $\sigma(t)=2.0$, and 10000 repetitions of inputs of 700 patterns. A data classification process using this result indicated experimentally that there were some prototypes in the boundary portion which are closest-neighboring prototypes for both "eye" and "nose", and therefore there existed some erroneous classifications. These errors resulted because, in contrast to the embodiment wherein prototypes are added in order to improve the resolution in the portion where cluster boundaries are once formed, in a method wherein a larger number of prototypes are used the learning for prototypes are performed so as to image the pattern distribution in the input space and, thus, the precision of data classification at the cluster boundary portion is not improved. In addition, in the embodiment, because the learning process is performed using a small number of prototypes initially, the time required fro the initial learning process can be shortened. As described above, because the second learning process in the embodiment may be a fine adjustment with the learning condition parameters changed, the total time required for the overall learning process including both the preliminary learning and the secondary learning can be shortened compared to a learning process in which a larger number of prototypes is utilized from the beginning.

ALTERNATIVE EXAMPLE

In the above description, clusters are determined by performing a learning process through recursive adjustment of learning condition parameters and using correlations between prototypes, new prototypes are added after the preliminary cluster determination, and secondary cluster determination process is applied. It is also possible to independently apply the prototype adding technique to a learning formation of a prototype map which is already being used or to a clustering technique. In this case, in addition to SOM, VQ learning or the like may also be employed for learning of the prototype map.

In addition, although the above description exemplifies a case of classification of image data, the data classifier according to the embodiment is not limited to such a configuration and may also be applied for classification of other data.

What is claimed is:

1. A sensor data classifier for classifying input sensor data using a result of a learning process based on the input sensor data and using a self-organizing map, the classifier comprising:
    means for forming, through learning, a plurality of first self-organizing maps corresponding to a plurality of learning parameters, each of the first self-organizing maps providing a corresponding first organization of the input sensor data; and
    means for evaluating each of the plurality of first self-organizing maps and adjusting the learning parameters based on an evaluation result, wherein
    the sensor data classifier performs a learning formation process of a second self-organizing map using the adjusted learning parameters, the second self-organizing map providing a corresponding second organization of the input sensor data.

2. The sensor data classifier of claim 1, wherein the input sensor data includes one or more of image data and voice data.

3. A sensor data classifier comprising:
    mapping means for mapping in a map space a plurality of prototypes that correspond to objects capable of being sensed by one or more sensors, the mapping means adjusting coupling weights between the plurality of prototypes using a plurality of input sensor data and forming a prototype map of the input sensor data through learning; and
    clustering means for calculating a predetermined measure defined between pairs of the prototypes and classifying the prototypes into a plurality of clusters based on the predetermined measure, the clusters representing a classification of the input sensor data, wherein
    the prototype map classified into clusters is supplied for a data classification process.

4. The sensor data classifier according to claim 3, wherein
    the clustering means provisionally determines clusters to which each prototype belongs;
    the clustering means calculates, for each cluster, a measure between at least one prototype belonging to the cluster and an observatory prototype to be classified into a selected cluster, and
    the clustering means determines the selected cluster to which the observatory prototype belongs based on the calculated measure.

5. The sensor data classifier according to claim 4, wherein
    a parameter used for calculating the measure is determined based on a distribution of an occurrence frequency of a degree of similarity between prototypes.

6. The sensor data classifier according to claim 3, wherein
    (a) the clustering means provisionally determines clusters to which the prototypes belong;
    (b) the clustering means sequentially selects each prototype as an observatory prototype to be classified into a cluster;
    (c) the clustering means calculates, for each cluster, a measure between at least one prototype belonging to the cluster and the observatory prototype;
    (d) the clustering means changes, as necessary, the cluster to which the observatory prototype belongs based on the calculated measure, and
    the processes of (b), (c), and (d) are repeated until there is no change in the cluster to which each prototype belongs so that each prototype is classified into a cluster.

7. The sensor data classifier according to claim 3, wherein
    forming the prototype map of the input sensor data through learning is achieved through a self-organizing mapping.

8. The sensor data classifier according to claim 3 further comprising:
    means for forming, through learning, a plurality of first self-organizing maps corresponding to a plurality of learning parameters, and
    means for evaluating each of the plurality of first self-organizing maps and adjusting the learning parameters based on an evaluation result, wherein
    a learning formation of a second self-organizing map is performed using adjusted learning parameters.

9. The sensor data classifier according to claim 8, wherein
    an evaluation of the first self-organizing maps is performed based on a phase relationship between a feature space for input sensor data and a prototype map space and on an average quantization error of the prototype map.

10. The sensor data classifier according to claim 3, wherein
    the sensor data classifier further comprises means for forming, after each of the prototypes is classified into a cluster, at least one new prototype in a boundary section of clusters, and
    for executing a further classification process of the new prototype into a cluster is enabled.

11. The sensor data classifier according to claim 10, wherein
    when the new prototype is formed, the sensor data classifier executes an additional learning process for the new prototype.

12. The sensor data classifier according to claim 10, wherein
    the new prototype is formed based on a statistical calculation for prototypes present in a neighborhood of cluster boundaries.

13. The sensor data classifier according to claim 10, wherein
    the new prototype is formed in portions wherein a density of input sensor data referred to by the prototypes is lower than a predetermined threshold value.

14. The sensor data classifier according to claim 10, wherein
    the new prototype is formed in a boundary section of clusters and in portions wherein a density of input sensor data referred to by the prototypes present in that section is lower than a predetermined threshold value.

15. The sensor data classifier according to claim 3, wherein
    the predetermined measure is calculated as a value of a function which rapidly and asymptotically approaches 0 from a predetermined differential value as a degree of similarity between an observatory prototype and a prototype in one of the clusters decreases, and
    the cluster to which the observatory prototype belongs is determined using the predetermined measure obtained as the value of the function.

16. The sensor data classifier of claim 3, wherein the input sensor data includes one or more of image data and voice data.

17. A computer implemented method for classifying sensor data according to one or more sensed characteristics in the sensor data by executing a learning process based on input sensor data and a target comprising organizing learning data using a self-organizing map and classifying the sensed characteristics in the input sensor data using a learning result, the method comprising the steps of:

forming, through learning, a plurality of self-organizing maps corresponding to a plurality of learning parameters, each of the self-organizing maps providing a corresponding first organization of the input sensor data; and evaluating each of the plurality of self-organizing maps based on the target and adjusting the learning parameters based on one or more evaluation results, wherein a new self-organizing map is formed through learning with adjusted learning parameters, the new self-organizing map providing a corresponding second organization of the input sensor data that facilitates identification of representations of the target in the sensor data.

18. The computer implemented method of claim 17, wherein the input sensor data includes one or more of image data and voice data.

19. A computer implemented method for classifying sensor data, comprising:

mapping in a map space a plurality of prototypes that correspond to objects capable of being sensed by one or more sensors;

forming, through learning, a prototype map by adjusting coupling weights between the plurality of prototypes according to a plurality of sensor data inputs, calculating a predetermined measure defined between pairs of the prototypes and classifying the prototypes into a plurality of clusters based on the predetermined measure, the clusters representing a classification of the sensor data and facilitating identification of representations of the object in the sensor data, and supplying the prototype map classified into clusters to a data classification process for classifying representations of the object in the sensor data.

20. A computer implemented method for classifying sensor data according to claim 19, further comprising the step of forming, after each of the prototypes is classified into a cluster, at least one new prototype in a cluster boundary.

21. A computer implemented method for classifying sensor data according to claim 19, wherein in the forming step, a plurality of learning parameters are used for learning formation of a plurality of prototype maps corresponding to the learning parameters, each of the plurality of prototype maps is evaluated, the learning parameters are adjusted based on one or more evaluation results, and learning formation of a new prototype map is performed using adjusted learning parameters.

22. A computer implemented method for classifying sensor data according to claim 21, wherein the prototype maps are evaluated based on a phase relationship between a feature space for the sensor data inputs and a prototype map space and on an average quantization error of the prototype maps.

23. The computer implemented method of claim 19, wherein the sensor data includes one or more of image data and voice data.

24. A computer executable medium including a sensor data classifying program which instructs a computer to execute a process to perform learning based on input sensor data using a self-organizing map and to classify the input sensor data according to a target represented by one or more sensed characteristics in the sensor data using results of the learning based on the target comprising organizing learning data, the program instructing the computer to execute the steps of:

forming, through learning, a plurality of self-organizing maps corresponding to a plurality of learning parameters, each of the self-organizing maps providing a corresponding first organization of the input sensor data; and evaluating each of the plurality of self-organizing maps based on the target and adjusting the learning parameters based on one or more evaluation results, wherein a learning formation process for a new self-organizing map is performed with adjusted learning parameters, the new self-organizing map providing a corresponding second organization of the input sensor data that facilitates identification of representations of the target in the sensor data.

25. The computer executable medium of claim 24, wherein the input sensor data includes one or more of image data and voice data.

26. A computer executable medium including a sensor data classifying program which instructs a computer to execute the steps of:

adjusting in a mapping procedure coupling weights between a plurality of prototypes in a map space using a plurality of input sensor data that includes one or more sensed characteristics and data representing a target;

forming, through learning, a prototype map;

a clustering procedure for calculating in clustering procedure a predetermined measure defined between pairs of the prototypes;

classifying the prototypes into a plurality of clusters based on the predetermined, the clusters representing a classification of the input sensor data; and supplying the prototype map classified into clusters to a data classification process that facilitates identification of one or more representations of the target in the sensor data.

27. A computer executable medium including sensor data classifying program according to claim 26, further instructing a computer to execute the step of:

forming, after each of the prototypes is classified into a cluster, at least one new prototype in a cluster boundary.

28. A computer executable medium including sensor data classifying program according to claim 26, wherein in the mapping procedure, a plurality of learning parameters are used to form, through learning, a plurality of prototype maps each corresponding to each of the learning parameter, each of the plurality of prototype maps is evaluated, the learning parameters are adjusted based on one or more evaluation results, and the learning formation of a new prototype map is performed with adjusted learning parameters.

29. A computer executable medium including sensor data classifying program according to claim 28, wherein an evaluation of the prototype maps is performed based on a phase relationship between a feature space for input sensor data and a prototype map space and on an average quantization error of the prototype map.

30. The computer executable medium of claim 26, wherein the input sensor data includes one or more of image data and voice data.

* * * * *